United States Patent
Cox

(10) Patent No.: US 6,458,177 B1
(45) Date of Patent: Oct. 1, 2002

(54) SYNTHETIC FIRE LOGS

(75) Inventor: Michael Cox, Bankeryd (SE)

(73) Assignee: Swedish Match UK Limited, Wycombe (GB)

(*) Notice: Subject to any disclaimer, the term of this patent is extended or adjusted under 35 U.S.C. 154(b) by 0 days.

(21) Appl. No.: 09/428,960

(22) Filed: Nov. 4, 1999

(30) Foreign Application Priority Data

Dec. 3, 1998 (GB) ............................................. 9826410

(51) Int. Cl.$^7$ ................................................. C10L 5/40
(52) U.S. Cl. ........................... 44/535; 44/544; 44/541; 44/543; 44/559; 44/562; 44/563; 44/576; 44/580; 44/593
(58) Field of Search ........................ 44/535, 534, 543, 44/544, 541, 562, 563, 559, 576, 580, 593, 572

(56) References Cited

U.S. PATENT DOCUMENTS

| | | | | |
|---|---|---|---|---|
| 3,297,419 A | * | 1/1967 | Eyre, Jr. ...................... | 44/535 |
| 3,346,352 A | * | 10/1967 | McCoy et al. ................. | 44/544 |
| 3,356,469 A | * | 12/1967 | Stephenson et al. ........... | 44/544 |
| 3,615,284 A | | 10/1971 | Cassar | |
| 3,660,055 A | * | 5/1972 | Haller ......................... | 44/535 |
| 3,973,922 A | * | 8/1976 | Williams ...................... | 44/535 |
| 4,046,518 A | | 9/1977 | Dalzell ........................ | 44/1 |
| 4,260,395 A | | 4/1981 | Anderson | |
| 4,326,854 A | | 4/1982 | Tanner | |
| 4,331,446 A | * | 5/1982 | Draper et al. ................. | 44/544 |
| 4,333,738 A | | 6/1982 | Schrader | |
| 4,539,011 A | * | 9/1985 | Kretzschmann ................ | 44/535 |
| 4,810,255 A | | 3/1989 | Fay, III et al. | |
| 4,822,380 A | * | 4/1989 | Young .......................... | 44/544 |
| 5,393,310 A | * | 2/1995 | Wollen ......................... | 44/535 |
| 5,755,836 A | * | 5/1998 | Beyer .......................... | 44/535 |
| 5,958,090 A | * | 9/1999 | Chandaria ..................... | 44/535 |

FOREIGN PATENT DOCUMENTS

| | | |
|---|---|---|
| EP | 0 047 123 | 3/1982 |
| GB | 2083075 | 3/1982 |

* cited by examiner

Primary Examiner—Margaret Medley
(74) Attorney, Agent, or Firm—Herbert Dubno

(57) ABSTRACT

A mixture includes paraffin wax and a thickening agent, the thickening agent being pseudoplastic above the melting point of the paraffin wax. The paraffin wax ideally makes up 50–99% w of the mixture, and the thickening agent 1–40% w of the mixture. The thickening agent includes diatomaceous earth. The mixture may include abrasive material, fibrous particles, and talc to affect its texture when applied to an article. Also disclosed is a synthetic log of combustible material including wood waste and a hydrocarbon (such as paraffin wax), and a coating applied in a state of low viscosity so as to partially or wholly cover the surface of the log, which then sets. This coating is ideally the mixture defined above. The log may be wrapped in a sleeve which features a transparent window, so the coating can be viewed, especially if the coating is only applied to part of the log's surface.

8 Claims, 2 Drawing Sheets

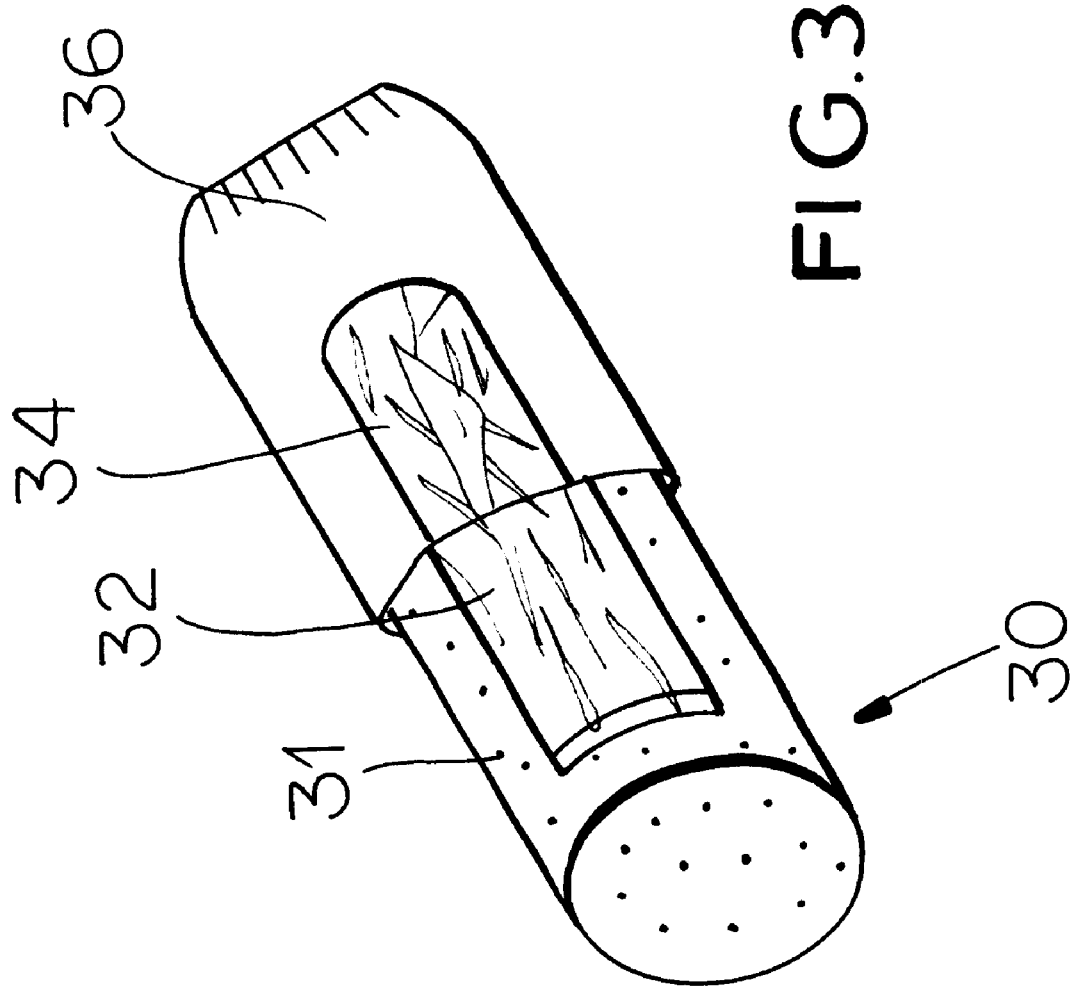

SYNTHETIC FIRE LOGS

FIELD OF THE INVENTION

The present invention relates to synthetic fire logs, that is, logs manufactured as substitutes for natural wood logs.

BACKGROUND OF THE INVENTION

Synthetic fire logs are usually composed of a mixture which includes wax and wood waste, a typical mixture ratio being 60% wax to 40% wood waste. This mixture is greasy to the touch, and inclined to crumble when being handled. After the mixture has been extruded in a cylindrical shape and cut into convenient lengths to form the log, it is usually wrapped in a polyethylene lined paper sleeve which is sealed at both ends.

This wrapping stops fragments of the log from dropping off, and makes the log less messy to handle, as the polyethylene does not permit oily elements in the log to soak into the paper. The polyethylene also provides additional fuel value to the log. This paper is also useful as a means of carrying instructions and other information about the log, and as a means of lighting the log. A typical log might weigh 1.25 kg and burn for 2½ hours.

A known type of firelighter is also composed of such a mixture of wood waste and paraffin wax.

Though effective, easy to light and very popular, the paper wrapped logs are not very attractive, whereas a real log fire retains a romantic appeal. Wrapping the logs in the paper requires dedicated equipment, and the paper is also in danger of being torn.

OBJECT OF THE INVENTION

The object of the present invention is to efficiently provide a synthetic log which resembles more closely a natural wooden leg, while retaining the convenience to the user of the paper wrapped logs of the prior art.

SUMMARY OF THE INVENTION

According to the present invention there is provided a mixture including paraffin wax and a thickening agent, the thickening agent being such that above the melting point of the paraffin wax the mixture is pseudoplastic as herein defined. Preferably, paraffin wax makes up 50 to 99% by weight of the mixture. Preferably, the thickening agent makes up 40% by weight of the mixture, and preferably, the thickening agent includes diatomaceous earth.

According to another aspect of the invention, there is provided a synthetic log comprising an inner portion of combustible material including wood waste and a hydrocarbon, surrounded by a coating of a different material, said coating being applied in a state of low viscosity so as to substantially cover the surface of the log, and thereafter setting. Preferably, the material of the coating comprises a pseudoplastic mixture such as described above.

According to a development of the invention, there is provided a synthetic log whose cross section is a quadrant. Preferably, two coatings are applied, one coating resembling bark applied to the curved surface 24, and the other coating resembling freshly cleaved wood being applied to the rectangular surfaces 22.

According to another embodiment of the invention, there is provided a synthetic log or firelighter made entirely out of a mixture of paraffin wax and filler material.

The wood waste and wax mixture of prior art logs is a dark brown color. It cannot though conveniently be sold without being wrapped for the reasons outlined above. A material is needed that retains the convenience of the paper wrapped product, that is, is clean, durable, and easy to light, but has a theology which allows it to be easily formed so as to have a texture resembling wood. Ideally then, it should be applicable in the manner of a paint, but quickly set so as to be hard to the touch, and should not drip while burning. It must also have a brown color.

Paraffin wax is readily inflammable, and has a convenient melting point, being molten about 50° C. When molten paraffin wax is mixed with a thickening agent or filler such a diatomaceous earth, the resulting mixture forms a thick, strongly pseudoplastic paste, that is, the mixture has a high viscosity when a low shear force is applied, and a low viscosity when a high shear force is applied.

Such a mixture may be applied in the manner of a paint, but will retain a texture imparted upon it. While the mixture is burning, it retains its pseudoplasticity, and does not drip. The proportion of thickening agent determines the pseudoplasticity of the mixture. The mixture also hardens as the wax solidifies on the cool log.

Such a mixture may be easily applied around a conventional log so as to fulfill the functions of the paper wrapping, that is, to hold the log together and help light it, and also mimic the look and texture of a natural log, which the paper is not able to do.

To substitute for the paper, the mixture must form a coat that is strong and tough enough to protect the log material beneath the coating, and be inflammable enough to be easily set alight. In order to accurately resemble natural wood, the mixture should be easily moldable, but should not drip while burning.

BRIEF DESCRIPTION OF THE DRAWING

A synthetic log embodying the invention will now be described, by way of example and not intended to be limiting, with reference to the drawing of which:

FIG. 3 is an embodiment of a synthetic log having a coating material upon part of the outer surface of the log and the log wrapped in a sleeve which features a transparent window.

DESCRIPTION OF THE PREFERRED EMBODIMENT

Figure 1:
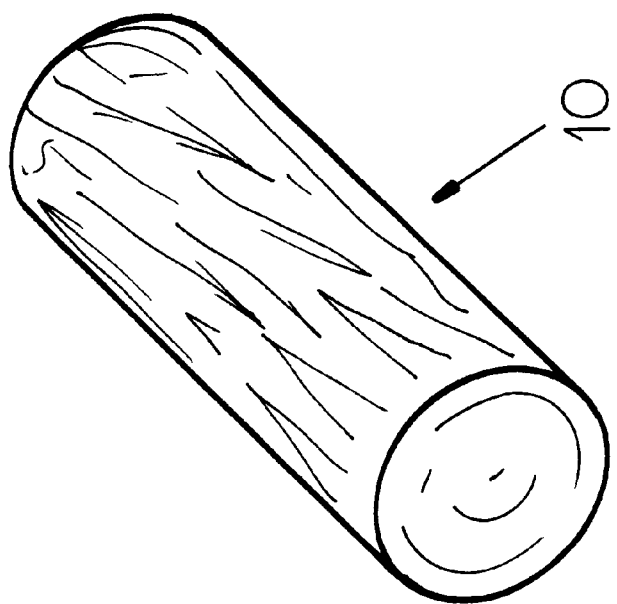
FIG. 1 is a synthetic log.

A log of conventional type, being made of wood waste and wax in the ratio of 40:60, is extruded and cut so as to form a short cylinder in the usual way. The log is then coated with a material which resembles the bark of a tree. The resulting textured log 10 is shown in FIG. 1. The coating is a dark brown color, and a similar roughness and texture to that of bark.

70% by weight paraffin wax (refined MP 52–54° C.) is melted and mixed with 26% by weight diatomaceous earth, 3% by weight red iron oxide and 1% by weight black iron oxide to produce a thick paste. The paraffin wax is molten above 50° C., though ideally the mixture is heated to 80° C. in order to apply it. Applied in a thick layer (typically 0.5 mm to 2 mm) by brush to the log, the coating cools and sets in a few seconds. Continual brushing of the coating until it has set brings out a bark like texture. The coating may also be applied by rollers, subsequent patterned rollers imprinting a texture upon the coating. The red and black iron oxides give the mixture a dark brown color.

The addition of the diatomasceous earth causes the mixture to be pseudoplastic, that is, the mixture has a high viscosity at low shear rates, but a low viscosity at high shear rates. Because of this, it is easily applied and after application accepts a texture imprinted upon it, both these operations applying relatively high shear rates. The coating and texture will not deform while setting, as under the low shear rates experienced it is more viscous.

Figure 2:
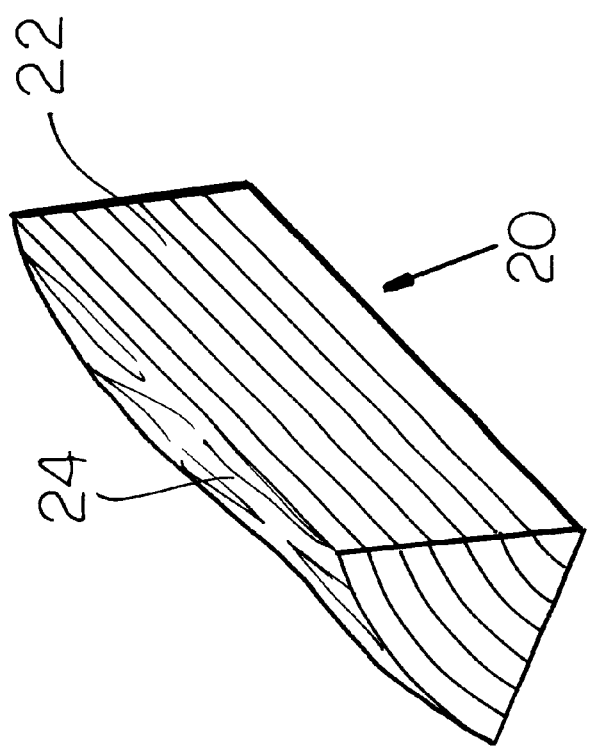
FIG. 2 is another embodiment of a synthetic log.

Referring to FIG. 2, in another embodiment of the invention a log of conventional composition is extruded so as to have a quadrant cross section (i.e. a 90° sector of a circle). The log could also be molded in this shape. The shape represents a natural log which has been axially cut into quarters. The mixture given above is applied in a similar fashion at 24 to the curved surface so as to resemble bark. Another mixture, comprising 76% by weight paraffin wax and 24% by weight diatomaceous earth, is applied at 22 to the two rectangular surfaces. This mixture is less viscous than the formerly described mixture, and is spread more thinly (typically 0.1 mm to 0.5 mm thick) with little brushing. The mixture, being thinner the mixture described in the first embodiment, retains the fine texture imparted by the bristles of the brush, so as to look alike to the parallel lines of naturally occurring wood grain. This mixture has a lighter hue, and resembles a freshly cleaved surface of a natural log. The hue may be lightened further by adding a white pigment such as approximately 2–3% by weight titanium dioxide. The ends of log, and of the cylindrical log described above, may also be coated with this lighter mixture, or they may be coated with the dark material described formerly.

The proportions of paraffin wax and thickening agent given in the embodiments are only illustrative of particular mixtures which may be applied to a synthetic log. The mixture could contain between 50–99% by weight paraffin wax, 1–40% by weight diatomaceous earth, and up to 10% by weight pigment.

For this application it is desirable to impart pseudoplasticity to the. molten paraffin wax by using a thickening agent making up a low solid content of the final mixture. Materials which achieve this generally have a relatively low bulk density, and are made up of acicular, plate-like or spiky particles. Other thickening agents, such as fumed silica and soaps, may be used instead of the diatomaceous earth, in which case the quantity of thickening agent needed to impart pseudoplasticity upon the paraffin wax may be as low as 1% by weight so that the mixture could contain between 50–99% by weight paraffin wax, 1–40% by weight thickening agent, and up to 10% by weight pigment.

In the embodiments described above, the mixture solidifies after it has cooled below the melting point of the wax, which happens rapidly after coming into contact with the log. Equally, the mixture could be made of such a nature that it sets upon drying, curing or similar process.

Other additives could be added so as to change the characteristics of the coating. Various oil compatible pigments may be used instead of or in addition to those mentioned here. In order to alter the texture of the coating, fibrous material such as sawdust or wood flour may be added for a rougher heavier texture, or sand for a more abrasive surface. Talc may be added, either throughout the mixture or brushed on the surface, to reduce the glossiness of the coating. The talc appears much like the natural bloom found upon some bark, and reduces any greasy feeling of the coating. Naturally, conventional additives such as flame colorants and perfumes could be included in the mixture.

The mixture may also be formed into solid blocks composed only of the mixture itself, to form firelighters for instance, or indeed an entire log.

FIG. 3 shows a synthetic log 30 comprising a portion 31 of combustible material include wood waste and a hydrocarbon and a coating 32 of a different material upon part of the outer surface of the log, the coating being applied in a state of low viscosity so as to partially cover the surface of the log and thereafter setting. The coating can comprise a mixture of paraffin wax and a thickening agent as has been described. The log can be wrapped in a sleeve 36 which features a transparent window 34.

Alternative embodiments using the principles disclosed will suggest themselves to those skilled in the art, and it is intended that such alternatives are included within the scope of the invention, the scope of the invention being limited only by the appended claims.

What is claimed is:

1. A method of making a synthetic log comprising the steps of:
   (a) fabricating an elongated combustible body comprising a hydrocarbon or wax;
   (b) preparing a coating composition comprised of 50 to 99% by weight of paraffin wax, up to 10% by weight of at least one pigment, and a thickening agent imparting pseudoplasticity to the composition in an amount of 1 to 40% by weight wherein said thickening agent is selected from the group which consist of diatomaceous earth, silica and soaps;
   (c) coating said body with said coating composition in a pseudoplastic state of said composition so that said body has a coating thereon which is pseudoplastic during and immediately after application of said coating;
   (d) while said coating is pseudoplastic, deforming said coating to impart a tree-bark texture to said coating and so that said coating retains said tree-bark texture; and
   (e) setting said coating to retain said texture therein.

2. The method defined in claim 1 wherein said coating composition is prepared by mixing 1 to 40% by weight of said thickening agent, 50 to 99% by weight paraffin and up to 10% by weight of at least one pigment.

3. The method defined in claim 1 wherein said coating composition contains at least one further material selected from the group which consists of abrasive particles, fibrous particles and talc.

4. The method defined in claim 1, further comprising the step of wrapping the body provided with said coating in a sleeve having a transparent window.

5. A synthetic log comprising:
   an elongated combustible body comprising a hydrocarbon or wax; and
   a set coating of a coating composition for application to said body, said coating composition being comprised of 55 to 99% by weight of paraffin wax up to 10% by weight of at least one pigment and 1 to 40% by weight of a pseudoplastic imparting amount of at least one thickening agent selected from the group which consists of diatomaceous earth, silica and soaps to form the coating composition for application to said body whereby said body is coated with said coating composition in a pseudoplastic state thereof, the coating is textured to a texture of a bark of a tree while the coating is pseudoplastic and the coating thereafter sets to retain the texture of the bark of the tree in said coating.

6. The synthetic log defined in claim 5 wherein said coating composition contains at least one further material selected from the group which consists of abrasive particles, fibrous particles and talc.

7. The synthetic log defined in claim 5, further comprising a wrapping for the body provided with said coating in the form of a sleeve having a transparent window.

8. A method of making a synthetic log comprising the steps of:
  (a) fabricating an elongated log-shaped combustible body comprised of wood waste and a hydrocarbon in a ratio of 40:60 or wood waste and wax in a ratio of 40:60;
  (b) preparing a coating composition by mixing 50 to 99% by weight of paraffin wax and 1 to 40% by weight of a thickening agent selected from the group which consists of diatomaceous earth, fumed silica and soaps, and optionally a pigment or at least one material selected from the group which consists of fibrous material, abrasive material and talc, said thickening agent imparting pseudoplasticity to the mixture;
  (c) coating said body with said coating composition in a pseudoplastic state of said composition so that said body has a coating thereon which is pseudoplastic during and immediately after application of said coating;
  (d) while said coating is pseudoplastic, deforming said coating to impart a tree-bark texture to said coating and so that said coating retains said tree-bark texture; and
  (e) setting said coating to retain said texture therein.

* * * * *